United States Patent
Lee et al.

[19]

[11] Patent Number: 6,033,567
[45] Date of Patent: Mar. 7, 2000

[54] DOWNHOLE FLUID SEPARATION SYSTEM INCORPORATING A DRIVE-THROUGH SEPARATOR AND METHOD FOR SEPARATING WELLBORE FLUIDS

[75] Inventors: Lawrence Lee, Bartlesville, Okla.; Jay S. Mann, Sherwood Park, Canada

[73] Assignee: Camco International, Inc., Houston, Tex.

[21] Appl. No.: 09/006,749

[22] Filed: Jan. 13, 1998

Related U.S. Application Data

[63] Continuation-in-part of application No. 08/657,225, Jun. 3, 1996, Pat. No. 5,730,871.

[51] Int. Cl.$^7$ .................................................. B01D 21/26
[52] U.S. Cl. ........................... 210/512.2; 210/512.1; 210/170; 210/416.5; 166/265
[58] Field of Search ................................ 210/170, 416.5, 210/512.1, 416.1, 512.2; 166/265

[56] References Cited

U.S. PATENT DOCUMENTS

| | | | |
|---|---|---|---|
| 4,241,787 | 12/1980 | Price | 166/105 |
| 4,673,338 | 6/1987 | Jones | 417/435 |
| 4,913,630 | 4/1990 | Cotherman et al. | 417/313 |
| 5,296,153 | 3/1994 | Peachey | 210/787 |
| 5,456,837 | 10/1995 | Peachey | 210/512.2 |
| 5,482,117 | 1/1996 | Kolpak et al. | 166/265 |
| 5,711,374 | 1/1998 | Kjos | 166/265 |

FOREIGN PATENT DOCUMENTS

| | | |
|---|---|---|
| 2 194 575 | 3/1988 | United Kingdom . |
| WO 94/13930 | 6/1994 | WIPO . |
| WO 97/11254 | 3/1997 | WIPO . |

OTHER PUBLICATIONS

Offshore (Inc., The Oilman), "Downhole Separator Uses Hydrocyclone, Zone Discharge," vol. 55, No. 6, Jun. 1995 p. 16.

Peachey et al., "Downhole Oil/Water Separator Development," Journal of Canadian Petroleum Technology, vol. 33 No. 7 Sep. 1994, pp. 17–21.

Reda, "Maximize Profits in Oil and Gas wells with Reda's Downhole Dewatering System," page and date unknown.

*Primary Examiner*—David A. Reifsnyder
*Attorney, Agent, or Firm*—Fletcher, Yoder & Van Someren

[57] ABSTRACT

A fluid separation system is provided for separating wellbore fluids into production fluids and non-production fluids. The system includes a separator adapted for transmitting mechanical power between a drive motor and at least one pump. The separator includes one or more separation units, such as hydrocyclone separators. A drive train traversing the separator is interfaced with drive elements, such as a submergible electric motor, and driven elements such as an injection or production pump. Wellbore fluids are channeled through the separator in either a push-through or pull-through manner. Production fluids are then transferred from the separator to the production pump for removal from the well. Non-production fluids are transmitted from the separator either to the injection pump for reinjection into a subterranean discharge zone, or directly into the discharge zone from the separator. The drive train elements traversing the separator are supported by antifriction bearings in interface plates on either end of the separator. The ability to transmit mechanical power through the separator facilitates assembly of pumping system components in various configurations as well as piping fluid communication paths between the pumping system components.

17 Claims, 13 Drawing Sheets

DOWNHOLE FLUID SEPARATION SYSTEM INCORPORATING A DRIVE-THROUGH SEPARATOR AND METHOD FOR SEPARATING WELLBORE FLUIDS

CROSS REFERENCE TO RELATED APPLICATIONS

This is a continuation-in-part of U.S. patent application Ser. No. 08/657,225, filed on Jun. 3, 1996 now U.S. Pat. No. 5,730,087.

BACKGROUND OF THE INVENTION

1. Field of the Invention

This invention relates generally to the field of petroleum production and fluid separation. In particular, the invention relates to a novel technique for driving components of a submergible pumping system including an oil/water separator for separating production fluids from non-production fluids in a wellbore.

2. Description of the Related Art

Various techniques have been devised for raising production fluids from petroleum wells. In general, where a well has sufficient pressure to raise fluids without assistance, the well may be exploited directly by the control of above-ground valving and other equipment. In many wells, however, production fluids must be raised to the earth's surface by artificial means, such as submergible pumping units. Known submergible pumping systems typically include a submergible electric motor coupled to a submergible pump. The electric motor is coupled to power supply and control circuitry at the earth's surface, and is energized to drive the pump. The pump and motor unit is submerged in the wellbore fluids. The pump transfers fluids from the wellbore to the earth's surface via a discharge conduit.

In an increasing number of wells, fluids entering the wellbore comprise a mixture of both production and non-production fluids, typically crude oil and water or brine. The non-production fluids must therefore be separated from production fluids either prior to or following extraction of the production fluids from the well. While the non-production fluids can be raised to the earth's surface and subsequently separated from the production fluids, removed water must then be disposed of, such as by reinjection into a disposal well. Moreover, production from the well is typically limited by the capacity of the pumping system, and by the amount of power input to the pumping system. Consequently, it is often more advantageous to separate non-production fluids from production fluids in the wellbore and to raise only the production fluids from the well. Non-production fluids such as water may then be directly reinjected into a subterranean disposal or injection zone.

Several techniques have been proposed and are currently in use for separating production fluids from non-production fluids in a wellbore. In some wells, the fluids may be separated by gravity, and submergible pumps used to raise production fluids and to reinject non-production fluids. Often, however, it is desirable to employ artificial separating means, such as mechanical separators. In one known type of separator, commonly referred to as a hydrocyclone separator, mixed production and non-production fluids are circulated through a separator vessel. Rotational velocity of the fluid causes different fluids having different specific gravities to separate from one another radially. The fluids, including production fluids and aqueous components, are removed from the separator in a continuous flow. Production fluids are then transferred to a production pump from which they are conveyed to the earth's surface for collection. Non-production fluids may be injected into a discharge horizon either by a separate pump, or currently, directly from the separator.

Such hydrocyclone separators offer a number of advantages over other separation techniques. In particular, hydrocyclone separators, which may be thought of as passive devices, have no moving parts, and may be used in groups to increase the throughput capacity of the system. While only coarse separation is typically attained through hydrocyclone separators, the ability to obtain relatively continuous separation in situ provides an attractive option to raising non-production fluids for subsequent separation and disposal.

Other in situ separators are also known which permit similar separation of production and non-production fluids within a wellbore. Such devices, which may be thought of as active separators, include centrifugal separators which mechanically impart rotational forces on the mixed fluids to separate production and non-production components from one another.

Known downhole separation configurations are, however, not without drawbacks. For example, depending upon the relative locations of production zones, discharge or injection zones, production rates and reject ratios (i.e., the portion of the wellbore fluids to be discharged or reinjected into designated formations), proper plumbing between pumps in a pumping system may be difficult or impossible. In general, hydrocyclone separators have been positioned at the end of a pumping system and supplied with unseparated wellbore fluids via a first pump. Because a second production pump is often physically distant from the separator in the pumping system, production fluids from the separator must then be routed via transfer tubing to the production pump for transfer to the earth's surface. However, where production and injection zones must be isolated from one another by means of packers or similar devices, routing fluids between the first pump and the separator, and between the separator and the production pump is complicated by the need to traverse the packers. Moreover, in many situations there may be insufficient clearance between the pumping system and the wellbore casing to permit passage of the needed transfer tubing between the components.

There is a need, therefore, for an improved technique for separating fluids in a wellbore that avoids such drawbacks of prior art systems. In particular, there is a need for a fluid separating system that affords a greater degree of freedom in the order of assembly and placement of pumping system components, including drive motors, injection and production pumps, separators, and so forth, facilitating piping between the components in the various configurations.

SUMMARY OF THE INVENTION

The invention provides an innovative approach to the downhole separation of wellbore fluids designed to respond to these needs. The inventive technique employs a drive-through separator which may be positioned between driving and driven components of the pumping system, such as between a submergible electric motor, and a submergible pump. The separator is particularly well suited for use in systems including a submergible drive motor and a pair of pumps. In a preferred embodiment, a first pump, driven by the motor, circulates wellbore fluids through the separator. Production fluids exiting the separator are transferred to a production pump. The production pump transfers the production fluids to a collection point at the earth's surface. Discharge fluids from the separator may be reinjected into a designated disposal zone or horizon adjacent to the wellbore. Because the separator may be positioned between the driving motor and one or both driven pumps, a wide range of pumping system configurations are possible. The configurations offer the well operator considerable freedom in accommodating wells for which piping of heretofore known systems would have been extremely difficult or impossible. The separator may be of an active or passive type, such as a hydrocyclone separator. Moreover, the separator may be employed in both push-through or pull-through configurations.

Thus, in accordance with a first aspect of the invention, a separator is provided for use in a pumping system including a pump and a drive motor operatively coupled to the pump. The pumping system is positionable in a wellbore to pump production fluids from the wellbore and to dispose of non-production fluids. The separator includes a housing, at least one separating section, and a power drive train. The housing is positionable between the pump and the motor. The separating section is disposed in the housing and is configured to receive wellbore fluids and to separate the wellbore fluids into production and non-production fluids. The power drive train traverses the separator housing and operatively couples the pump to the motor.

In accordance with another aspect of the invention, a downhole fluid separating system is provided for separating production fluids from non-production fluids in a wellbore. The system includes a pump for pumping the production fluids and a fluid conduit coupled to the pump for transferring the production fluid from the pump to the earth's surface. The system also includes a motor operatively coupled to the pump for driving the pump. A separator is interposed between the pump and the motor. The separator receives wellbore fluids and separates the wellbore fluids into production fluids and non-production fluids. A power drive train is provided for transmitting torque from the motor to the pump. The drive train is at least partially disposed within the separator.

In accordance with a further aspect of the invention, a fluid separating system for separating wellbore fluid into production and non-production fluids includes a submergible motor, a separator for receiving the wellbore fluid and for separating the wellbore fluid into production and non-production fluids, and first and second pumps. The first pump is operatively coupled to the motor for circulating wellbore fluid through the separator. The second pump is operatively coupled to the motor for pumping production fluid from the separator to the earth's surface. The separator is disposed between the motor and at least the first or the second pump. The separator includes means for transmitting mechanical power from the motor. The separator may thus be positioned between the pumps, or between both pumps and the motor.

The invention also provides a method for separating wellbore fluid into production and non-production fluids. In a first step of the method, a pumping system is assembled including a modular separator unit, first and second pumps, and a drive motor operatively coupled to the first and second pumps. The modular separator unit is interposed between the drive motor and either the first or the second pump. The pumping system is then positioned in the wellbore fluid. The drive motor is powered to drive the first and second pumps. The first pump circulates wellbore fluid through the separator, while a second pump receives production fluid from the separator and transfers the production fluid to the earth's surface. In accordance with a particularly preferred embodiment of the method, the non-production fluid is injected into a subterranean disposal zone adjacent to the wellbore directly from the modular separator unit.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
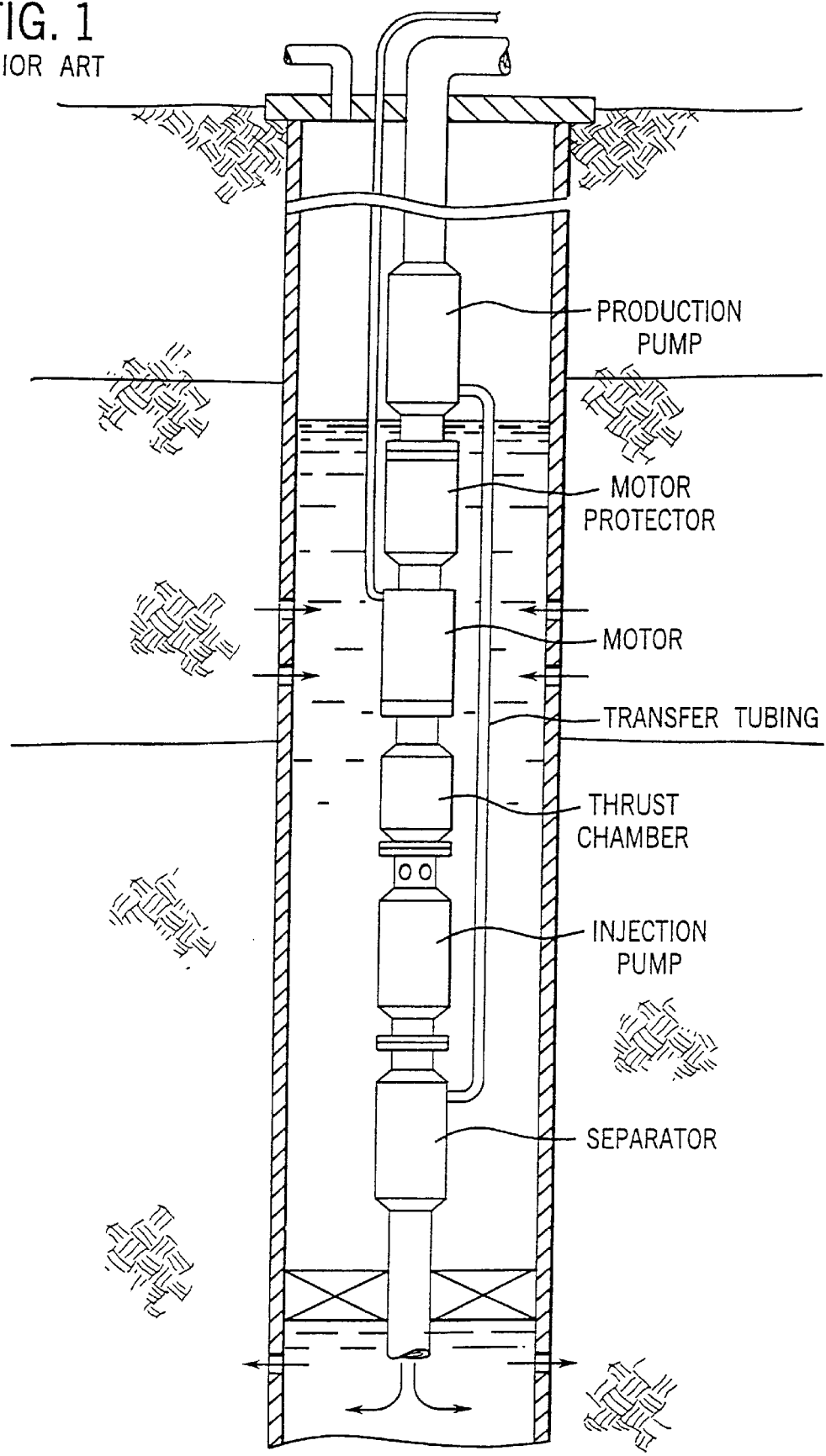
FIG. 1 is a vertical elevational view of a pumping system positioned in a wellbore in accordance with a prior art technique for separating wellbore fluids, pumping production fluids to a location above the earth's surface, and disposing of non-production fluids.

Turning now to the drawings, and referring first to FIG. 1, a pumping system is illustrated for separating wellbore fluids in accordance with certain heretofore known techniques. Specifically, the pumping system includes a production pump, a motor, an injection pump and a fluid separator. A motor protector is positioned intermediate the production pump and the motor. The motor is configured for driving both the production pump and the injection pump via internal power transmission shafts. The separator is positioned below the injection pump to receive flow from the injection pump. In operation, fluids enter the wellbore adjacent to the pumping system and are drawn into the injection pump. Fluids are then forced through the separator where production fluids are separated from non-production fluids, typically water. Production fluids are then transferred via transfer tubing to the production pump, while non-production fluids are injected into a discharge zone isolated by a set of packers. Production fluid from the production pump is forced to the earth's surface where it is collected and further processed.

Figure 2:
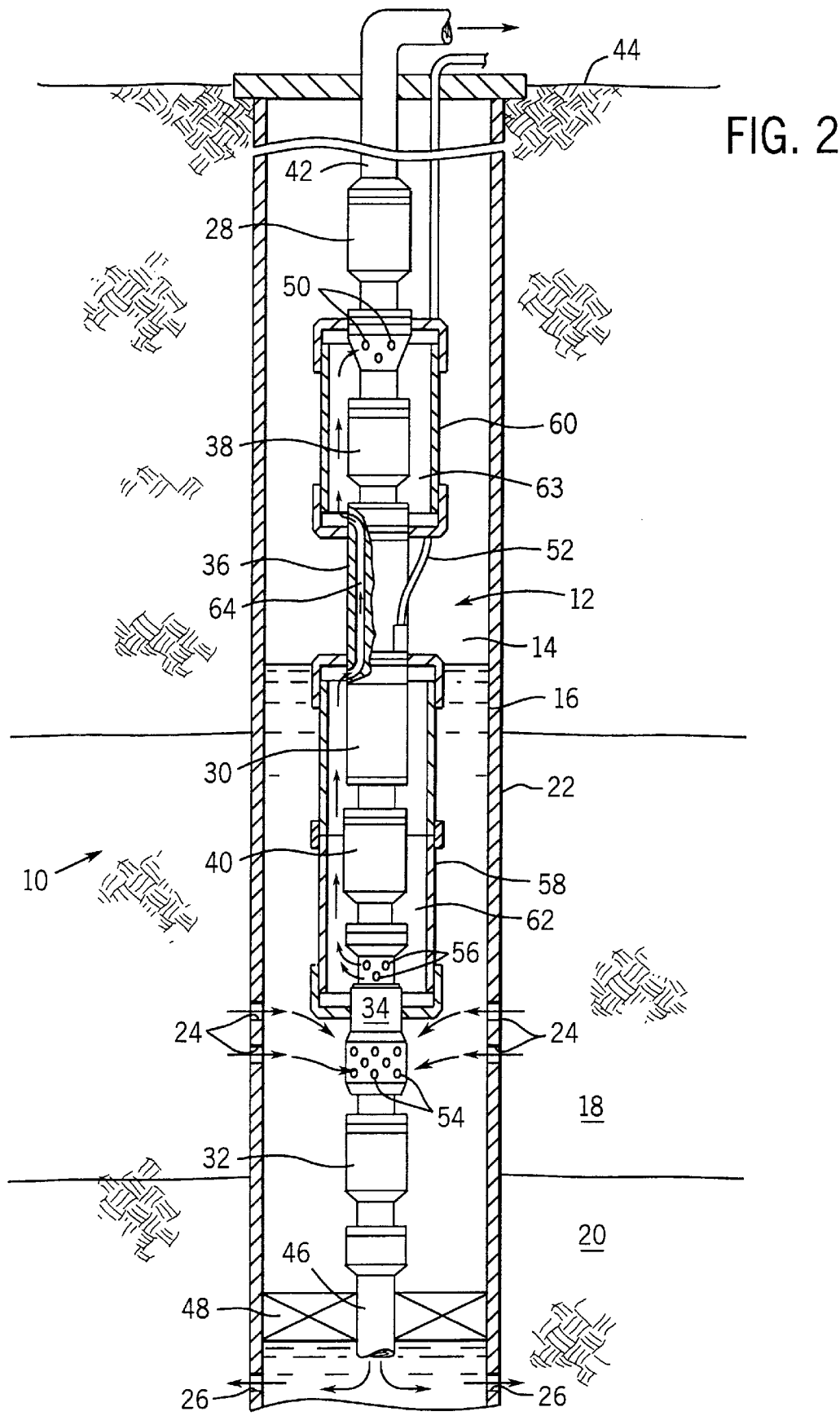
FIG. 2 is a vertical elevational view of a pumping system in accordance with certain aspects of the present invention configured for separating wellbore fluids into production and non-production fluids, and for transmitting production fluids through components of the pumping system, while transferring non-production fluids to a subterranean injection zone.

FIG. 2 illustrates a pumping system in accordance with certain aspects of the present invention. The pumping system illustrated in FIG. 2 is designated generally by the reference numeral 10, and includes a pumping unit 12 positioned in a well 14. Well 14 is defined by a wellbore 16 which traverses a number of subterranean zones or horizons, including a production zone 18 and a discharge zone 20. In general, production zone 18 comprises geological formations containing fluids, such as oil, condensate, gas and water. Discharge zone 20 comprises earthen formations appropriate for the discharge or injection of non-production fluids, such as water. It should be noted that while in the embodiment illustrated in FIG. 2, system 10 is employed in a well wherein production zone 18 lies nearer the earth's surface than discharge zone 20, system 10 may be equally well employed in formations wherein the reverse is true. In general, pumping system 10 may be used in vertical, inclined and horizontal wellbores having one or more production zones and one or more discharge zones in various physical configurations.

Wellbore 16 is lined by a casing 22 in which system 10 is deployed. Casing 22 is, in turn, traversed by production perforations 24 adjacent to production zone 18, and by discharge perforations 26, adjacent to discharge zone 20. In operation, wellbore fluids, including production fluids and non-production fluids in mixture, enter into wellbore 16 through production perforations 24. System 10 operates to separate the wellbore fluids into production and non-production fluids, reinjecting the non-production fluids into discharge zone 20, and transferring production fluids through fluid flow paths defined within system 10 to a collection point above the earth's surface.

Referring now more particularly to a preferred configuration of pumping unit 12, as illustrated in FIG. 2, unit 12 preferably includes a series of modular components assembled into a submergible unit. In the embodiment illustrated in FIG. 2, pumping unit 12 includes a first pump 28, a drive motor 30, a second pump 32 and a fluid separator 34. Also as illustrated in FIG. 2, pumping unit 12 includes a connection module 36 and a pair of motor protectors 38 and 40. A fluid conduit 42 is coupled to pump 28 to transmit production fluids from pump 28 to a location above the earth's surface, as indicated by reference numeral 44. Another transfer conduit 46 is coupled to pump 32 to transmit non-production fluids to a location adjacent to discharge zone 20. Conduit 46 traverses an isolation packer 48 which effectively isolates fluids and pressure adjacent to discharge zone 20 from fluids entering through production perforations 24.

Pump 28, which in the illustrated embodiments functions as a production pump, and pump 32, which functions as an injection pump, may be of any suitable type, such as centrifugal pumps available commercially from Reda of Bartlesville, Okla. Pump 28 has inlet or intake apertures 50 through which pump 28 draws fluids to be transferred to the earth's surface. Production conduit 42 is coupled to the outlet of pump 28, and may comprise any suitable type of conduit, such as coil tubing.

Motor 30 is drivingly coupled to pump 28 through motor protector 38. Motor 30 is preferably a submergible polyphase electric motor coupled to an electrical power supply above the well (not represented) via a power supply and control cable 52. Cable 52 extends through wellbore 16 from the earth's surface and is electrically coupled to motor 30 through connection module 36, as described more fully below. It should be noted, however, that for certain aspects of the structure and technique described herein, motor 30 may be any suitable type of prime mover, such as a single-phase electric motor, a hydraulic motor, and so forth. In the embodiment illustrated in FIG. 2, motor 30 is designed to drive components on either end thereof. Accordingly, motor 30 is coupled to pump 28 through motor protector 38 by means of a drive shaft disposed within connection module 36, as described more fully below, as well as to second pump 32 through a series of drive shafts traversing separator 34 and motor protector 40. Motor protectors 38 and 40 provide isolation of motor 30 from well fluid entering pump 28 and separator 34 in a manner well known in the art.

In the presently preferred embodiment illustrated, separator 34 includes drive train components for transmitting torque between driving and driven components of pumping unit 12, such as from motor 30 to pump 32. Separator 34 may therefore be physically interposed between such components. Separator 34 preferably includes hydrocyclone separating devices which receive fluid from wellbore 16 through a series of intake apertures 54, and express production fluids through a series of discharge apertures 56. Separator 34 also discharges non-production fluids directly to second pump 32, which forces the non-production fluids into discharge zone 20 via discharge perforations 26.

In the preferred embodiment illustrated, fluid flow paths are defined between the components of pumping unit 12 by a series of adjustable shrouds as well as by a passageway defined through connection module 36. In particular, a first shroud 58 is sealingly disposed about unit 12 from an upper portion of separator 34 to a central portion of connection module 36. A second or upper shroud 60 is sealingly disposed about unit 12 from a central portion of connection module 36 to a lower portion of production pump 28. Shrouds 58 and 60 surround adjacent sections of pumping unit 12 to define annular fluid flow paths 62 and 63, respectively. Fluid flow path 62 directs a fluid flow from discharge apertures 56 of separator 34 upwardly around motor 30, and into a fluid passage 64 defined within connection module 36. Fluid exits fluid passage 64 of connection module 36 and enters upper flow path 63 which directs the fluid to inlet apertures 50 of production pump 28. As described more fully below, this preferred structure permits fluid to be transferred between the components of pumping unit 12 in a sealed manner without the use of separate piping. Moreover, the fluid flow directed by shrouds 58 and 60 aids in convectively cooling the system, particularly motor 30. Also, connection module 36 permits cable 52 to be electrically coupled to motor 30 without traversing a shroud wall. As also described more fully below, shrouds 58 and 60 are preferably extensible and contractible with respect to portions of pumping unit 12 over which the shrouds extend, thereby permitting relative expansion and contraction of the shrouds and of the pumping unit components while maintaining the desired seal defining fluid paths 62 and 63.

In operation, motor 30 receives electrical power through cable 52 and drives pump 28 through connection module 36 and motor protector 38. Motor 30 also drives pump 32 through motor protector 40 and separator 34. Production fluid extracted from wellbore fluids in separator 34 is directed through a fluid flow path defined by lower shroud 58, fluid passage 64 of connection module 36, and upper shroud 60 to enter into intake apertures 50 of pump 28. The fluids are transferred by pump 28 through production conduit 42 to a collection point (not represented) above the earth's surface 44. Non-production fluids separated from the wellbore fluids within separator 34 are transferred to pump 32 from which they are expelled via discharge conduit 46.

As will be appreciated by those skilled in the art, the configuration of pumping system 10 illustrated in FIG. 2 may be referred to as a "pull-through" system. In such systems, the separator is positioned upstream or on the suction side of an injection pump, such as pump 32. The injection pump therefore draws flow through the separator and expels non-production fluids into a section of the wellbore adjacent to the discharge zone. Separator 34 may also be assembled in pumping systems configured as "push through" systems, wherein wellbore fluids are drawn directly into a first pump and expressed from the pump into the separator.

Figure 3:
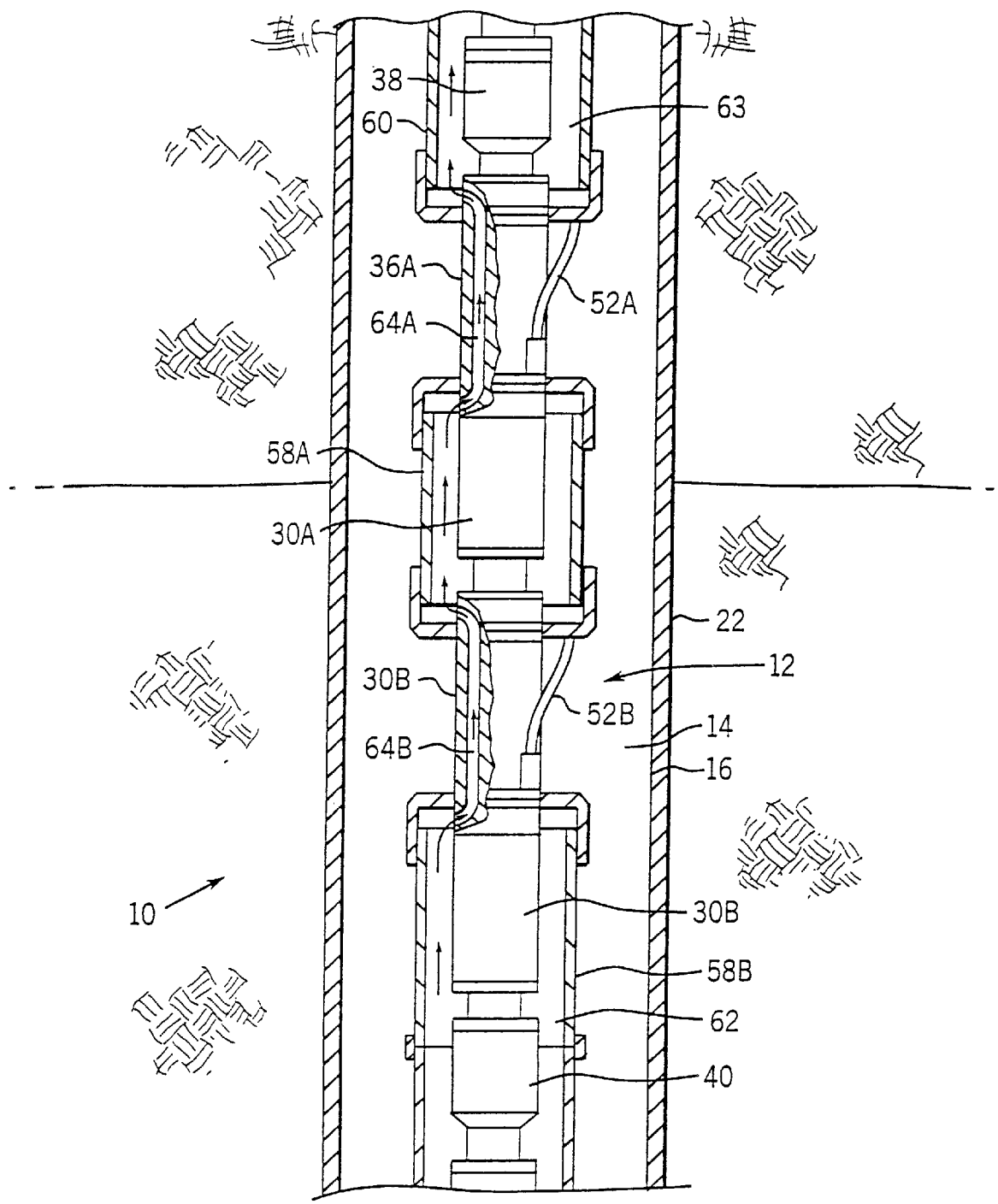
FIG. 3 is a vertical elevational view of a portion of a pumping system of the type illustrated in FIG. 2, showing a preferred manner for coupling two separate drive motors in the pumping system in lieu of a single drive motor.

As will also be appreciated by those skilled in the art, while a single drive motor may be employed in pumping system 10 as shown in FIG. 2, the system may be alternatively configured with more than one drive motor as illustrated in FIG. 3. In particular, FIG. 3 illustrates a section of the pumping system represented in FIG. 2 between upper motor protector 38 and lower motor protector 40. Other system components not illustrated in FIG. 3 may be substantially the same as those shown in FIG. 2.

In the alternative embodiment illustrated in FIG. 3, a first motor 30A is provided for driving a first pump (see pump 28 in FIG. 2), while a second motor 30B is provided for driving a second pump (see pump 32 in FIG. 2). Upper motor 30A drives through an upper connection module 36A and a motor protector 38 in manner similar to that described above with reference to FIG. 2. Lower motor 30B drives through a motor protector 40 and additional system components disposed below motor protector 40 as described above with reference to FIG. 2. A lower shroud 58B is provided about lower components of the pumping unit, including lower motor 30B, to direct fluid upwardly about motor 30B to a lower connection module 36B. Connection module 36B includes a fluid passage 64B through which fluid flowing upwardly is conveyed to an intermediate shroud 58A. Intermediate shroud 58A surrounds upper motor 30A and conveys fluid from lower connection module 36B to upper connection module 36A. Connection module 36A includes a fluid passage 64A which directs fluid from shroud 58A upwardly to an upper shroud 60. As described above with reference to FIG. 2, upper shroud 60 directs fluid upwardly from connection module 36A toward a production pump.

The sealed connections between shrouds 58A, 58B and 60 may be substantially identical to those about shrouds 58 and 60 of FIG. 2, as described more fully below. Also, each shroud is preferably constructed as an extensible structure to permit thermal expansion and contraction of both the shrouds and pumping unit 12. Moreover, each connection module 36A and 36B includes a recess for receiving a respective power cable 52A and 52B for transmitting electrical power to motors 30A and 30B, respectively. It should be noted, however, that in the configuration illustrated in FIG. 3, no mechanical transmission components need traverse lower connection module 36B, as lower motor 30B drives directly through motor protector 40 in a single direction.

Figure 4:
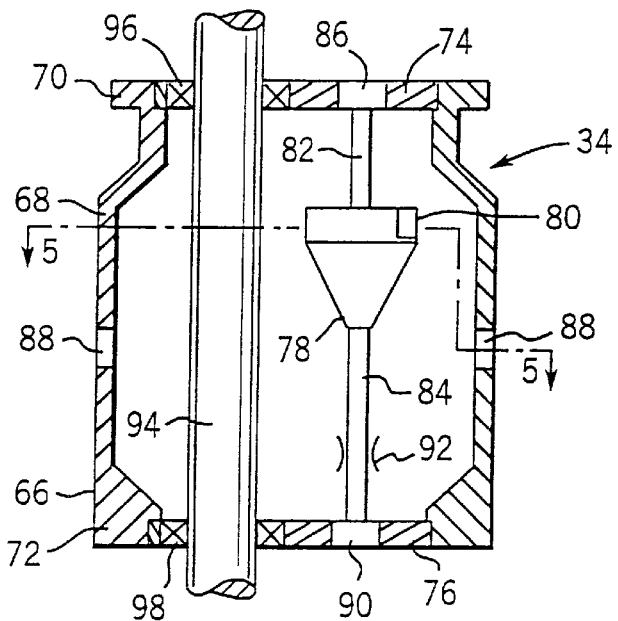
FIG. 4 is a diagrammatical vertical sectional view of a drive-through separator for use in a pumping system of the type illustrated in FIG. 2, including a through shaft and a hydrocyclone separator venting through an end plate of the separator unit.
Figure 5:
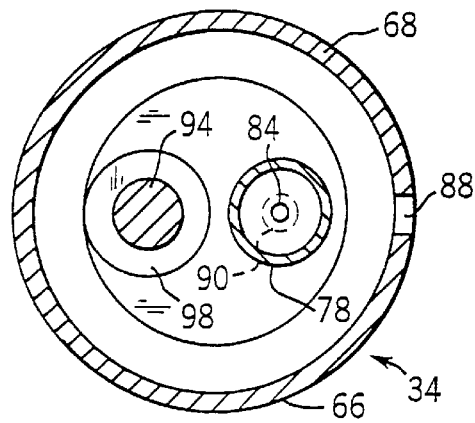
FIG. 5 is a sectional view of the separator illustrated in FIG. 4 along line 5—5, illustrating the position of the internal elements of the separator unit.

FIGS. 4 through 8 represent exemplary internal configurations of drive-through separators for use in submergible fluid pumping systems in accordance with certain aspects of the present technique. As illustrated in FIGS. 4 and 5, separator 34 includes a housing 66 having a side wall 68 terminating in an upper attachment flange 70 and a lower attachment flange 72. Flanges 70 and 72 permit separator 34 to be secured in a modular fashion in pumping unit 12 as summarized above. A support or interface plate 74 is positioned radially within side wall 68 adjacent to flange 70. A similar support or interface plate 76 is positioned within side wall 68 adjacent to lower flange 72. One or more separators 78, such as hydrocyclone separators as shown, are provided within housing 66.

Separator 78 may be of a generally known configuration, including an inlet 80, a production outlet 82, and a non-production outlet 84. In the embodiment illustrated in FIGS. 4 and 5, production outlet 82 is coupled to a production port 86 provided in interface plate 74. An inlet port 88 is formed in side wall 68 to permit wellbore fluids to enter into housing 66. In the embodiment of FIGS. 4 and 5, non-production outlet 84 is plumbed through a non-production port 90 in interface plate 76. In operation, wellbore fluids enter housing 66 through inlet port 88 and are channeled through hydrocyclone inlet 80 to be separated into production and non-production fluids. Production fluids are then transmitted through outlet 82 and, thereby, through production port 86. Non-production fluids are routed through outlet 84 and exit housing 66 through non-production port 90. A fixed or variable orifice 92 may be provided in outlet 84 to provide back pressure for operation of hydrocyclone separator 78. It should be noted that where several separators are provided within housing 66, these may be plumbed in series or in parallel. Where multiple separators are provided in parallel, a fixed or variable orifice 92 if preferably disposed about a common outlet or header.

In addition to hydrocyclone separator 78, separator 34 includes one or more elements of a power drive train for transmitting torque from the drive motor to one or more pumps. In the embodiment illustrated in FIG. 4, a drive shaft 94 is disposed through housing 66. Drive shaft 94 is supported within separator 34 by bearings 96 and 98 lodged in interface plates 74 and 76, respectively. As will be appreciated by those skilled in the art, ends of shaft 94 may be keyed, splined or otherwise configured for interfacing in a modular fashion with other components of the pumping system upon installation of separator 34, as described more fully below. Thus, for example, where separator 34 is to be incorporated in the configuration illustrated in FIG. 2, a lower end of shaft 94 will be configured to interface with a drive train through pump 32, while an upper end of shaft 94 will be configured to interface with a similar drive train through motor protector 42.

Figure 6:
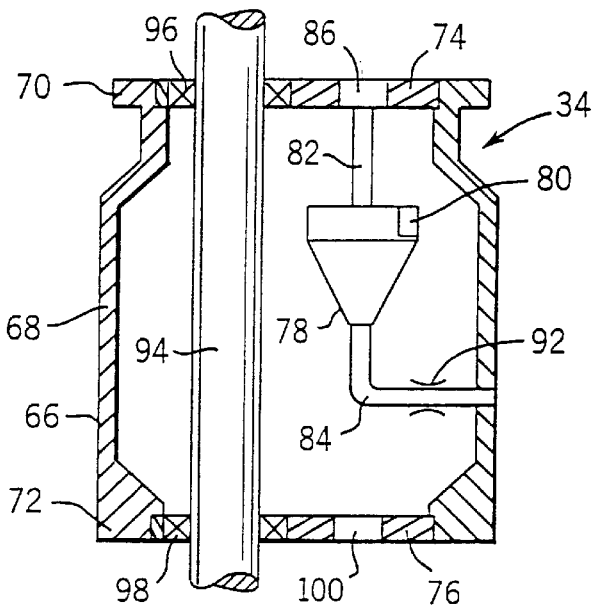
FIG. 6 is a diagrammatical vertical sectional view of an alternative configuration of the drive-through separator of FIG. 4, wherein the separator vents through a side wall of the unit.

Shaft 94 may be positioned coaxially within housing 66 or, as illustrated in FIGS. 4, 5 and 6, may extend generally parallel to an axis of housing 66, but offset from the housing axis. In the latter case, housing 66 may itself be coupled to adjacent components of pumping unit 12 via offset flanges or similar interface hardware (not shown).

FIG. 6 illustrates an alternative configuration of separator 34. In the embodiment of FIG. 6, hydrocyclone separator 78 is ported through side wall 68, and lower interface plate 76 is configured to receive wellbore fluids. One or a series of inlet ports 100 are formed in interface plate 76 to permit separator 34 to receive fluids, such as from an upstream pump 32 in a push-through system configuration. In the embodiment of FIG. 6, non-production fluids are ejected through side wall 68. As mentioned with regard to FIG. 4, although a single hydrocyclone separator 78 is illustrated within separator 34 of FIG. 6, multiple hydrocyclone separators may be provided and interconnected either in series or in parallel. A power transmission drive train, including shaft 94, extends through separator 34 and is supported by bearings 96 and 98 fitted to interface plates 74 and 76, respectively.

It should be noted that, while in the present description reference is made to upper and lower flanges, and upper and lower interface plates of separator 34, as will be appreciated by those skilled in the art, separator 34 may be oriented in a pumping system either in the position illustrated in FIGS. 4 and 6, or in an inverted position. The position selected will typically depend upon the relative position of the pumps within the pumping system and the flow paths desired by the well operator.

Figure 7:
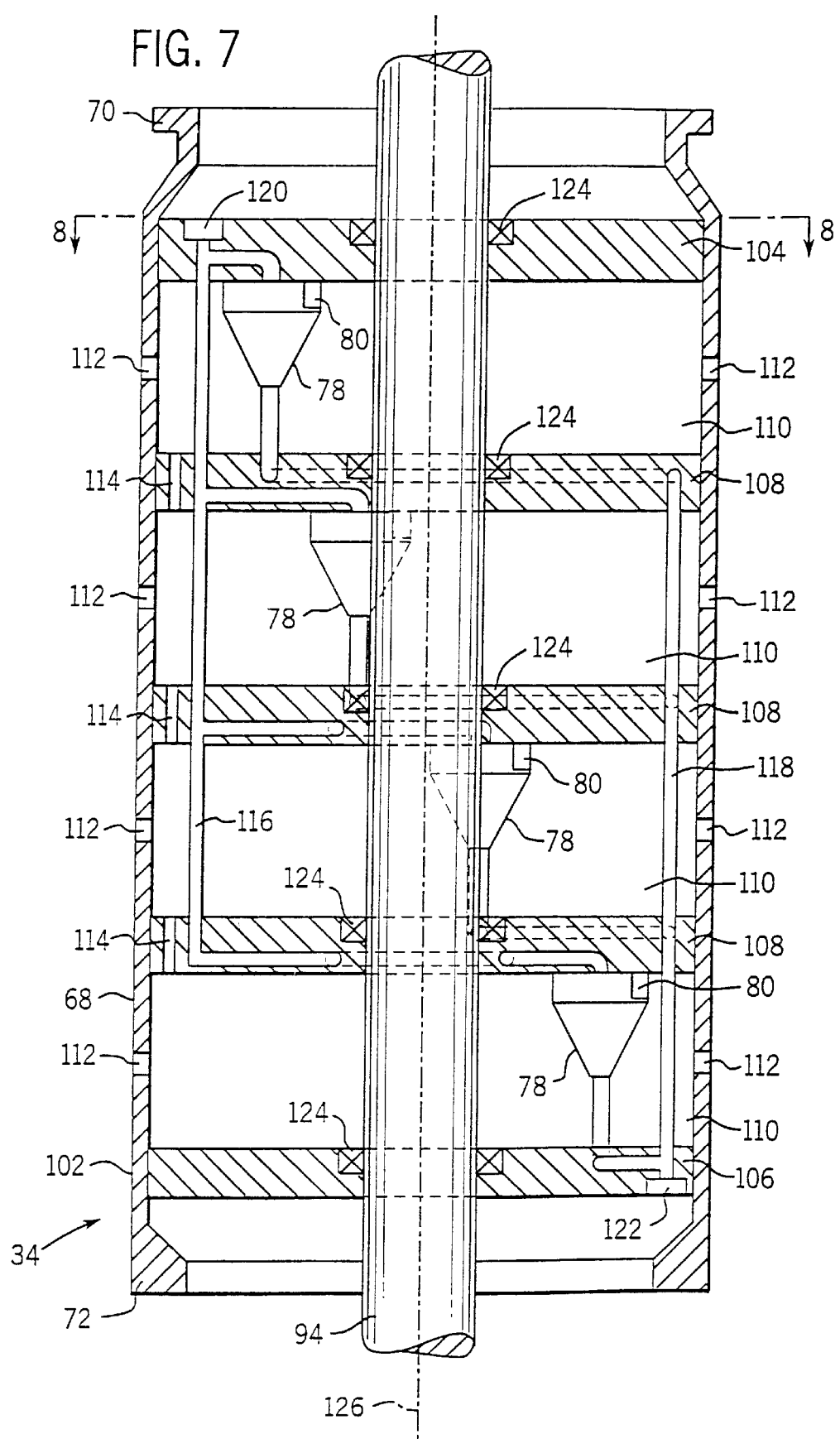
FIG. 7 is a diagrammatical vertical sectional view of an alternative configuration of a drive-through separator including a series of hydrocyclone separators and a shaft disposed coaxially within the housing of the unit.
Figure 8:
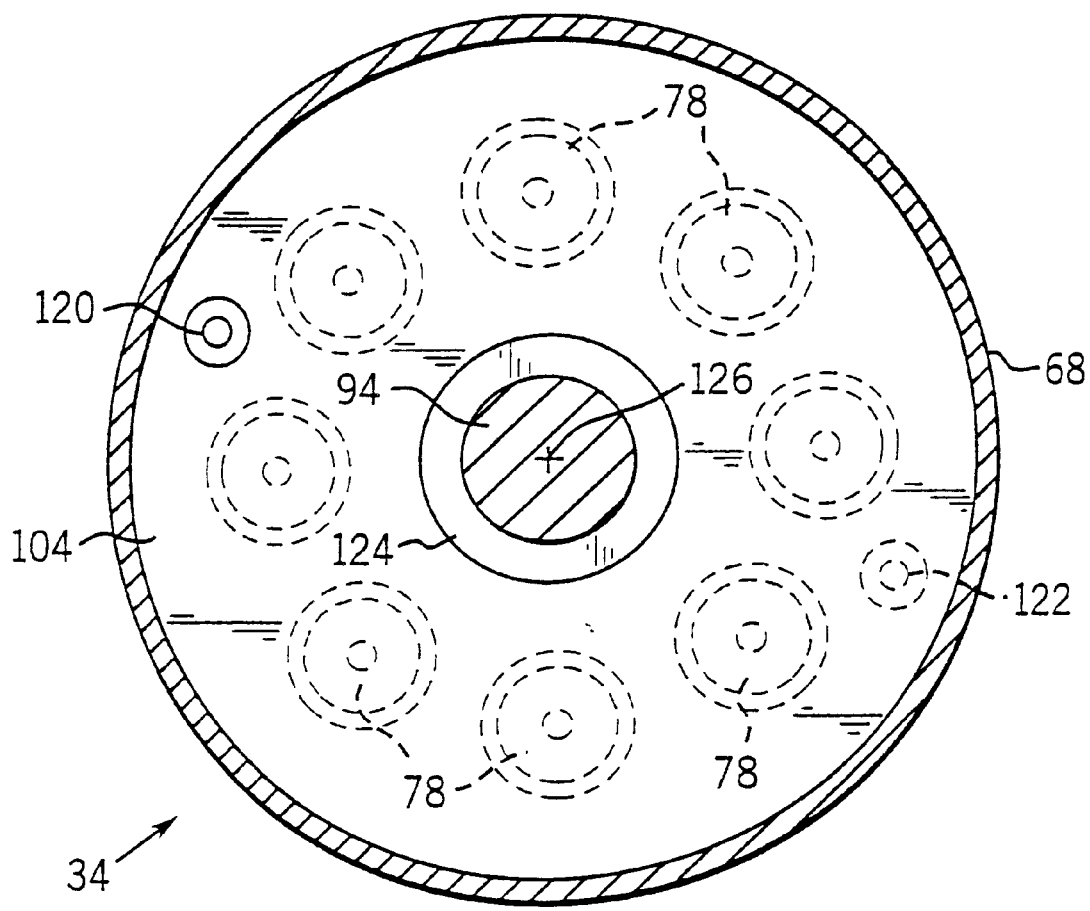
FIG. 8 is a sectional view through the separator illustrated in FIG. 7 along line 7—7, illustrating the positions of internal components of the separator with respect to one another.

As mentioned above, separator 34 may be configured to include a number of hydrocyclone separators 78 positioned with a single unit. Also, the elements of the power transmission drive train traversing separator 34 may be positioned concentrically with the housing. FIGS. 7 and 8 illustrate a separator of this type. Specifically, as shown in FIG. 7, separator 34 includes a housing 102 in which a top end plate 104 and a bottom end plate 106 are positioned. A series of intermediate plates or manifolds 108 are secured within housing 102, to define interior chambers 110. Inlet ports 112 are formed through side wall 68 of housing 102 to permit wellbore fluids to be drawn into separator 34. Where such ports 112 are provided for each chamber 110, pressure equalizing ports 114 are preferably formed in intermediate plates 108 to permit the exchange of sufficient fluid between the chambers to equalize pressure within the separator. Each end plate and intermediate plate is plumbed to one or more hydrocyclone separators 78.

As in the previous embodiments, each hydrocyclone separator 78 includes and inlet 80, a production outlet 82, and a non-production outlet 84. In the embodiment illustrated in FIGS. 7 and 8, production outlets 82 are plumbed through a common production header 116 which terminates in top end plate 104. Similarly, non-production outlets 84 of the hydrocyclone separators are plumbed through a common non-production discharge header 118, which terminates in bottom end plate 106. A ported production outlet 120 is formed in plate 104 to receive flow from production header 116. Similarly, a ported non-production fluid outlet 122 is formed in end plate 106. In operation, wellbore fluids are drawn into separator 34 via intake ports 112 to be separated into production and non-production fluids by hydrocyclone separators 78. Production fluids are then transferred upwardly through header 116 to exit separator 34 through port 120. Non-production fluids flow from hydrocyclone separators 78 through non-production header 118 to exit separator 34 through port 122.

Shaft 94 extends through housing 102, being supported by both end plates 104 and 106 and intermediate plates 108. As shown in FIG. 7, for separators having a particularly long housing 102, multiple bearing sets may be provided along the length of the housing for supporting shaft 94 in rotation. In the specific embodiment illustrated in FIG. 7, bearings 124 are provided in the end plates as well as in intermediate plates along separator 34. Because hydrocyclone separators 78 are positioned in a radial distribution within housing 102 (see FIG. 8), shaft 94 is conveniently provided along a central axis 126 of housing 122. As summarized above with respect to FIGS. 4 through 6, ends of shaft 94 are formed to interface with drive components of pumping unit 12, to transmit torque between the submergible drive motor and a pump coupled to the drive motor through the intermediary of separator 34.

While the separator illustrated in FIG. 7 is particularly well suited to pull-through separation systems, it will be appreciated by those skilled in the art that the unique features of the separator may be adapted for use in push-through systems. Accordingly, an inlet port for wellbore fluids may be provided in either upper plate 104 or lower plate 106. Outlets for routing non-production fluids from the hydrocyclone separators may then be ported through side wall 68, similar to the arrangement illustrated in FIG. 6, permitting non-production fluids to be injected directly into a discharge zone adjacent to the separator.

It should also be noted that the embodiment of separator 34 illustrated in FIGS. 7 and 8 may be subject to a variety of alternative configurations. For example, in a presently preferred configuration, a series of hydrocyclone separators are positioned on one side of housing 122. Sixteen such hydrocyclone separators are embodied in a single unitary device. A cable for supplying electrical energy to a submergible motor may be positioned on the outside of the pumping system, on the same side as the hydrocyclone separators. Because in a typical well application the submergible pumping unit has much less clearance within the wellbore than illustrated diagrammatically in the Figures, the presence of the cable adjacent to the pumping system urges separator ports provided in the housing away from the well casing, facilitating flow into the separator. Other alternative configurations may be envisaged by those skilled in the art depending upon wellbore clearances, orientations, production and rejection rates, and so forth. Moreover, dynamic separating units may be employed in place of the hydrocyclone separators described above.

Figure 9:
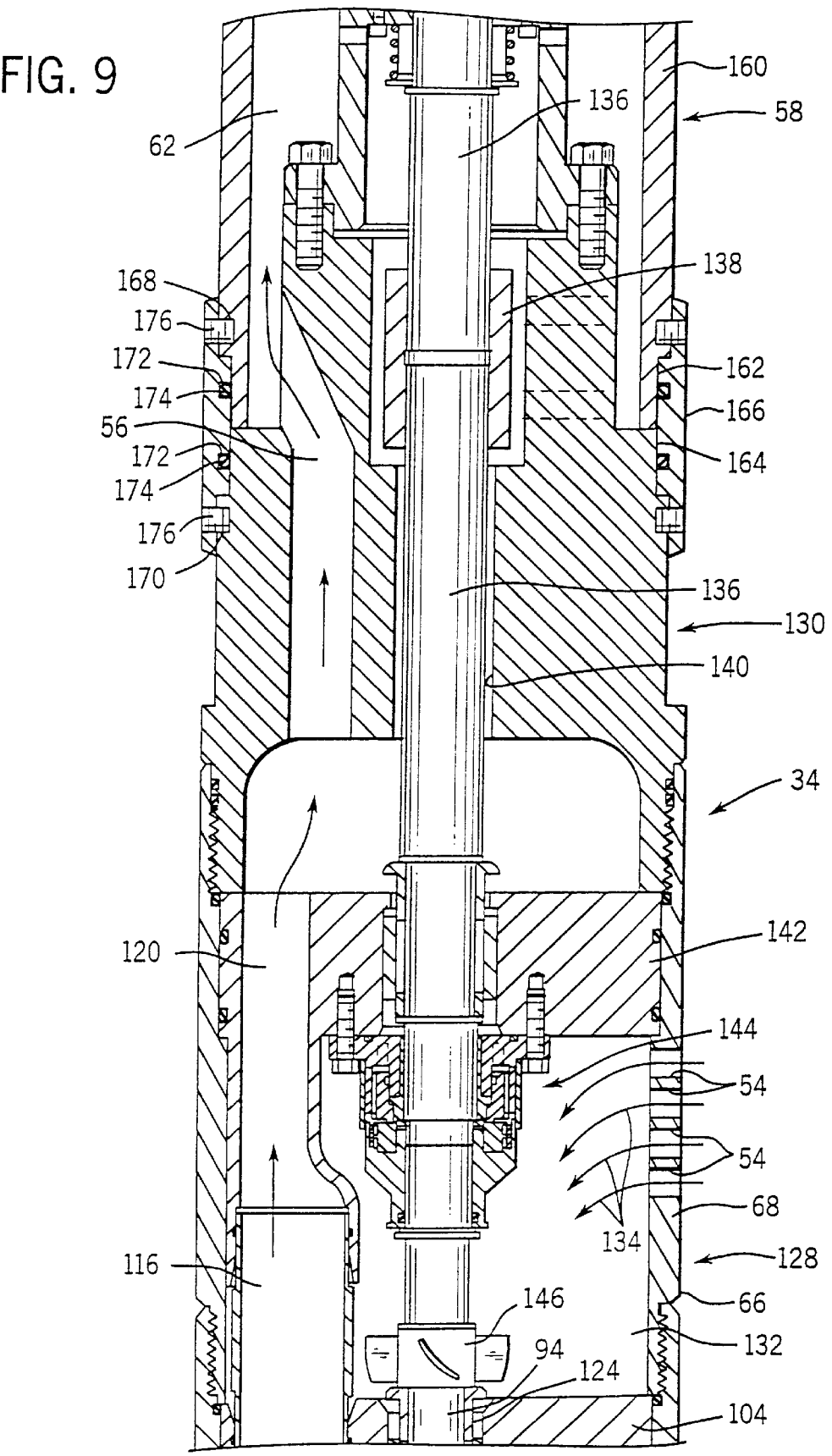
FIG. 9 is a sectional view through an upper end of a separator of the type illustrated in the Figures above, showing a preferred manner for channeling fluids through the internal passageways in the end of the separator and into an extensible shroud for communicating production fluids to other components of the pumping system.
Figure 10:
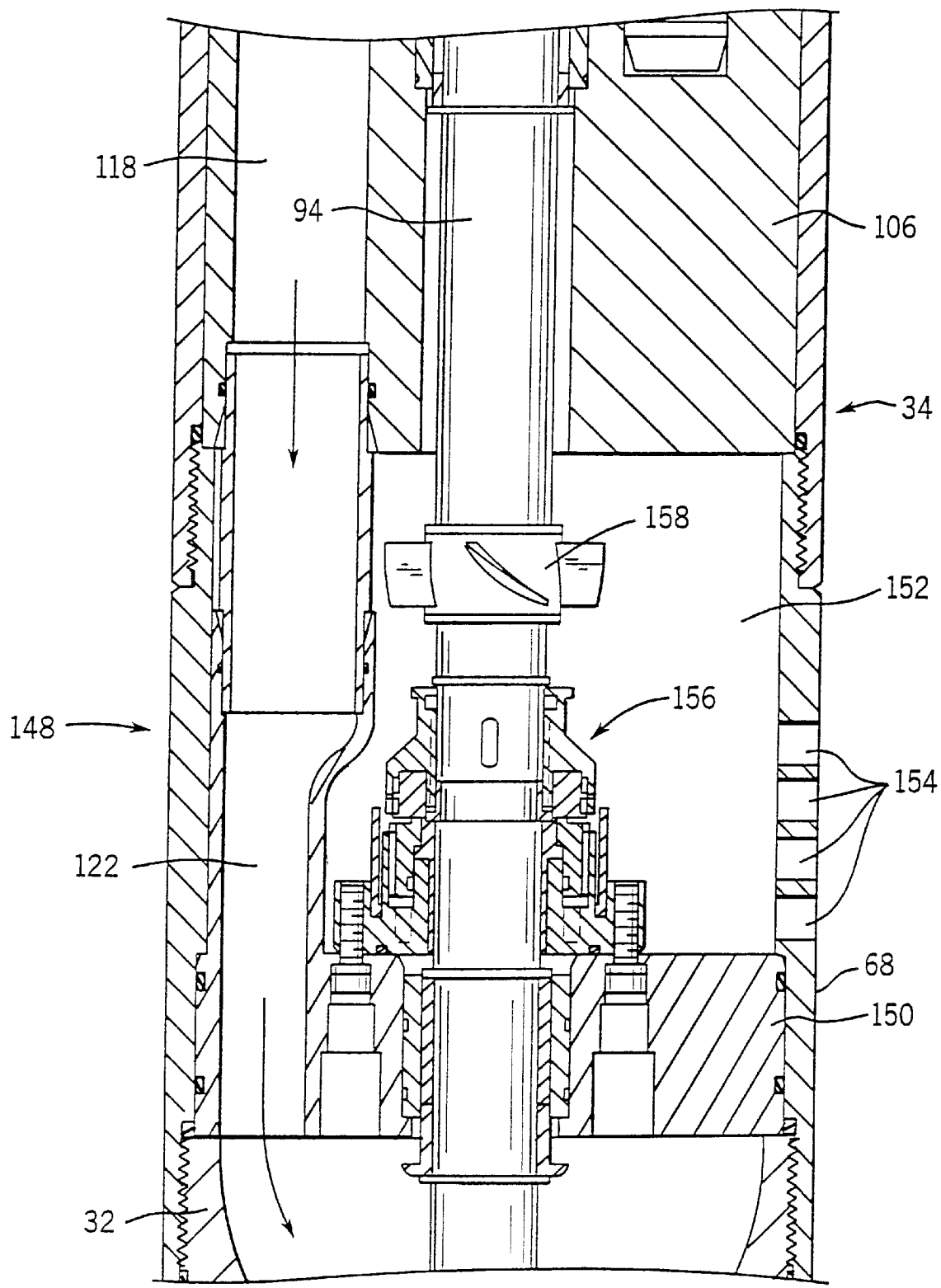
FIG. 10 is a sectional view through a lower end of a separator of the type illustrated in the preceding Figures.

FIGS. 9 and 10 illustrate the presently preferred configurations for upper and lower ends of separator 34 when coupled to adjacent components of pumping system 10. In particular, as illustrated in FIG. 9, the upper end of separator 34 includes an intake section, designated generally by the reference numeral 128, and a transfer section 130. In the illustrated embodiment, intake section 128 serves to draw wellbore fluids into the separator, while transfer section 130 serves to transmit production fluids upwardly in the pumping unit toward production pump 28. Specifically, side wall 68 of intake section 128 forms an intake chamber 132 which is in fluid communication with wellbore fluids external to separator 34 via intake apertures 54. Wellbore fluids enter into intake chamber 132 through apertures 54 as indicated by arrows 134. A series of shaft sections 136 are coupled to shaft 94 of separator 34 to transmit torque to shaft 94 from motor 30, as illustrated in FIG. 2 (or motor 30B as illustrated in FIG. 3). The shaft sections are coupled to one another via couplings 138 in a manner generally known in the art. Bores 140 are formed through the internal components of both the intake section 128 and transfer section 130 to accommodate shaft 94 and shaft sections 136.

As described above with respect to FIGS. 7 and 8, a production header 116 carries production fluids separated from wellbore fluids in separator 34 to a production outlet 120. Production header 116 and production outlet 120 are separated from wellbore fluids entering into intake chamber 132 by a seal plate 142. Seal plate 142 is sealed within the inner periphery of side wall 68 as illustrated in FIG. 9. A mechanical seal assembly 144 is secured to a lower face of seal plate 142, and surrounds and seals against shaft 94 to isolate wellbore fluids within intake chamber 132 from production fluids passing through production outlet 120 and discharge apertures 56. Seal assembly 144 is preferably of a conventional design available commercially from Flowserve of Tulsa, Okla. Below seal assembly 144, and within intake chamber 132, an impeller 146 is secured to shaft 94 and rotates with shaft 94. Impeller 146 forces circulation of wellbore fluids entering into intake chamber 132 to promote convective cooling of seal assembly 144. From intake chamber 132, wellbore fluids are drawn through the individual separator units included in separator 34 as described above.

FIG. 10 illustrates the internal configuration of the lower end of separator 34 in accordance with the presently preferred embodiment. As shown in FIG. 10, shaft 94 passes through end plate 106 in which discharge header 118 is provided. Discharge header 118 is sealed to non-production fluid outlet 122 for transferring non-production fluids in a downward direction for injection into an appropriate subterranean discharge zone. A lower end of shaft 94 is sealed from the upper end of second pump 32 by a seal plate 150, similar to seal plate 142 described above with reference to FIG. 9. Seal plate 150 is sealed to the inner periphery of side wall 68 of separator 34 to form a seal chamber 152 between end plate 106 and seal plate 150. A series of apertures 154 are formed through side wall 68 to permit wellbore fluids to enter into seal chamber 152. A seal assembly 156 is secured to an upper face of seal plate 150 and seals against rotating shaft 94 to isolate seal chamber 152 from the intake side of pump 32. Seal assembly 156 is preferably substantially similar to seal assembly 144 described above. An impeller 158 is secured to shaft 94 and rotates with shaft 94 to circulate wellbore fluids within seal chamber 152 to promote convective cooling of seal assembly 156.

As described generally above, the fluid directing shrouds included in the preferably preferred embodiment of pumping system 10 are extensible and contractible to permit relative extension and contraction of both the shrouds and portions of pumping unit 12 over which the shrouds extend during operation, while maintaining a fluid-tight seal around the annular flow paths defined by the shrouds. While various configurations may be envisioned by those skilled in the art to permit the shrouds to seal against pumping unit 12 while allowing for thermal expansion and contraction, in presently preferred embodiments one or both ends of the shrouds may be fixedly secured to components of pumping unit 12 and a sliding seal provided at appropriate positions along the length of the shroud to accommodate expansion and contraction.

Figure 11:
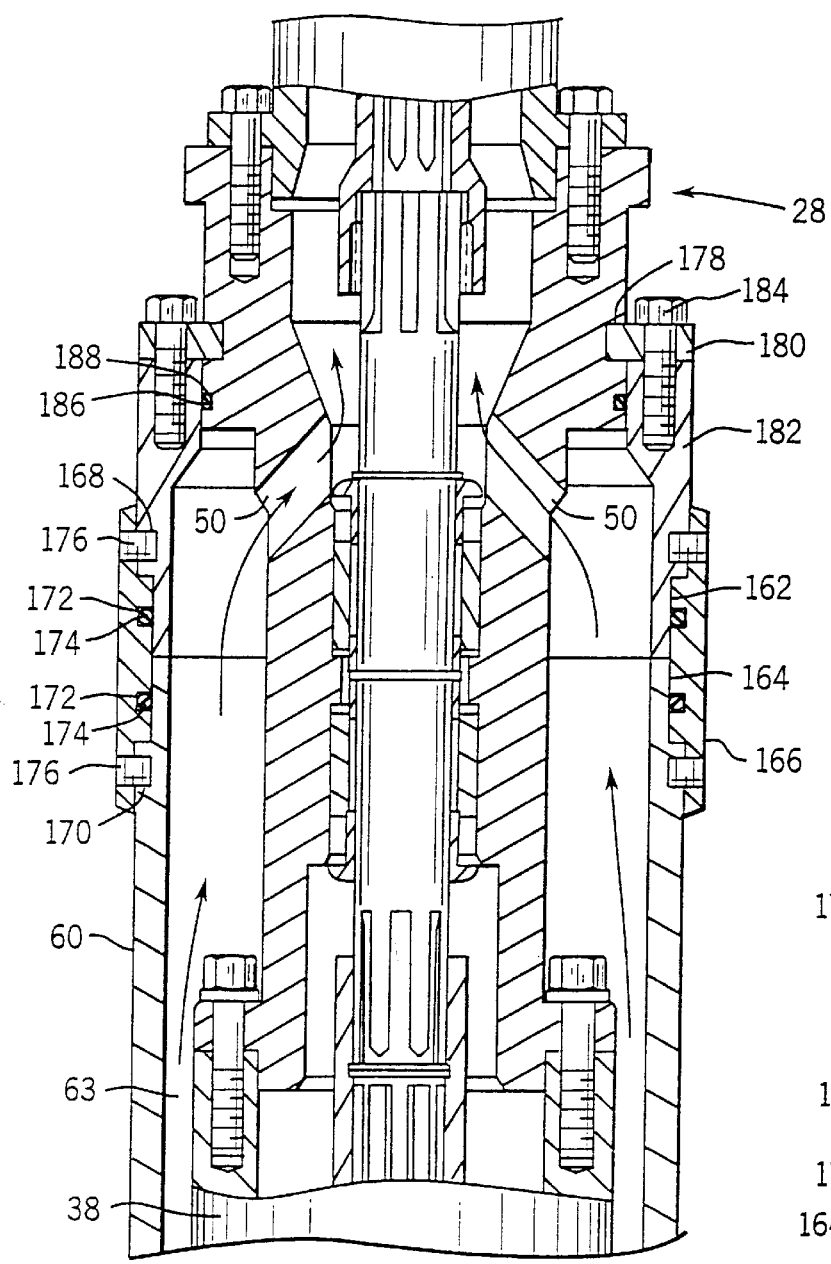
FIG. 11 is a sectional view through a portion of the pumping system of FIG. 2, illustrating a preferred manner for securing an extensible shroud to a lower intake of a production pump.

FIGS. 9 and 11 illustrate two presently preferred arrangements for securing one end of a shroud fixedly to an element of pumping system 12. Specifically, as illustrated in FIG. 9, each shroud comprises an elongated tubular body 160 extending along a portion of pumping unit 12 to define an annular flow path, such as indicated at reference numeral 62 in FIG. 9. As shown in FIG. 9, shroud 58 is secured to an upper end of transfer section 130 of separator 34. To sealingly secure the shroud to separator 34, a first sealing land 162 is formed about the lower outer periphery of shroud body 160, while a similar sealing land 164 is formed about the outer periphery of transfer section 130. A coupling ring 166 is secured about both sealing lands to hold body 160 and an upper end of transfer section 130 in close abutment. In the illustrated embodiment, coupling ring 166 serves both to maintain the shroud body 160 in a desired position with respect to the pumping unit component, as well as to seal the fluid flow paths defined within the component and the shroud to one another. Accordingly, adjacent to each sealing land 162 and 164, annular grooves 168 and 170 are formed. Within an inner periphery of coupling ring 166, seal grooves 172 are formed, and sealing members, such as O-rings 174 are disposed within the grooves.

During assembly, coupling ring 160 is placed over land 164 to compress sealing member 174 slightly to form a fluid-tight seal between land 164 and the inner periphery of coupling ring 166. Shroud body 160 is then inserted into the position illustrated in FIG. 9, forming a fluid-tight seal between land 162 and the upper sealing member 174. A series of fasteners 176 are secured in apertures around the upper and lower periphery of coupling ring 166 and enter into grooves 168 and 170 to maintain the elements in the sealed position illustrated. In a presently preferred embodiment, a series of 14 set screws 176 are secured in corresponding apertures about upper and lower ends of coupling ring 166.

As illustrated in FIG. 11, in accordance with another preferred arrangement a flange-type structure is used to secure a shroud end to a component of pumping unit 12. FIG. 11 illustrates an upper end of shroud 60 which extends about motor protector 38 and directs fluid to upper pump 28 via pump intake apertures 50. Shroud 60 is secured to a lower section of pump 28 by a flanged coupling structure as follows. A peripheral flange groove 178 is formed about the lower end of pump 28 adjacent to intake apertures 50. A flange 180 is fitted within groove 178 and an annular flanged coupling 182 is secured to flange 180 by means of fasteners 184. Flanged coupling 182 is sealed about pump 28 by means of a seal member 186 disposed within an annular groove 188 formed in a peripheral face of pump 28.

A coupling ring 166 is secured about a lower end of flanged coupling 182 to hold an upper end of shroud 60 in place and to seal the annular fluid path 63 within shroud 60 in fluid communication with inlet apertures 50. Coupling ring 166 is preferably substantially similar to that described above with respect to FIG. 9. Accordingly, to permit coupling ring 166 to be mechanically secured to flanged coupling 182 and to an upper end of shroud 60, coupling 182 includes a sealing land 162 and an annular groove 168, while the upper end of shroud 60 includes a similar sealing land 164 and annular groove 170. A pair of seal grooves 172 are formed in the inner face of coupling ring 166, and a seal 174 is disposed in each groove. Coupling ring 166 is fitted about sealing land 162, and shroud 60 is fitted into coupling ring 166 to compress seals 174 and thereby to seal coupling ring 166 about both flanged coupling 182 and shroud 60. Fasteners 176, such as a series of set screws, are secured within apertures about the periphery of coupling ring 166, entering into grooves 168 and 170 to mechanically hold shroud 60 in place below flanged coupling 182.

Figure 12:
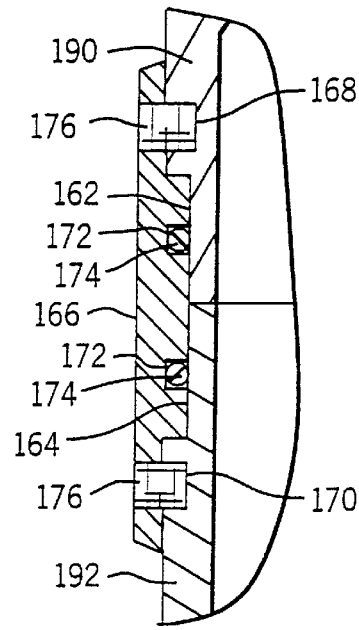
FIG. 12 is a sectional detail view of a portion of an extensible shroud illustrating a preferred manner for joining tubular sections of the shroud.

It should be noted that in addition to the coupling ring and flange structures described above, those skilled in the art may envision alternative arrangements for sealingly securing ends of the extensible shrouds to components of pumping unit 12. In particular, threaded ends of the shroud body and of mating coupling ring elements may be provided for mechanically securing the shrouds in place, while maintaining the desired fluid-tight seal. It has been found that the preferred embodiments described above, however, facilitate field installation of the shrouds, while maintaining the desired nominal lengths of the shroud sections for thermal expansion and contraction as described below.

Where pumping system 10 includes particularly long shroud sections, as illustrated in the case of shroud 58 in FIG. 2, the shroud body may comprise a plurality of tubular sections joined end-to-end as illustrated in FIG. 12. In the presently preferred embodiment, shroud lengths of over 20 feet are divided into tubular sections of this type to facilitate the manufacture, transport and installation. As illustrated in FIG. 12, tubular sections 190 and 192 of a shroud may be joined to one another by means of a coupling ring system of the type described above. Accordingly, each shroud section 190 and 192 presents an outer peripheral sealing land 162 and 164, respectively. A coupling ring 166 of the type described above with reference to FIGS. 9 and 11, is fitted about the shroud sections and includes seals 174 fitted within inner peripheral annular grooves 172. Annular grooves 168 and 170 are formed adjacent to sealing lands 162 and 164 and receive fasteners, such as set screws 176, for securing the shroud sections to one another.

Figure 13:
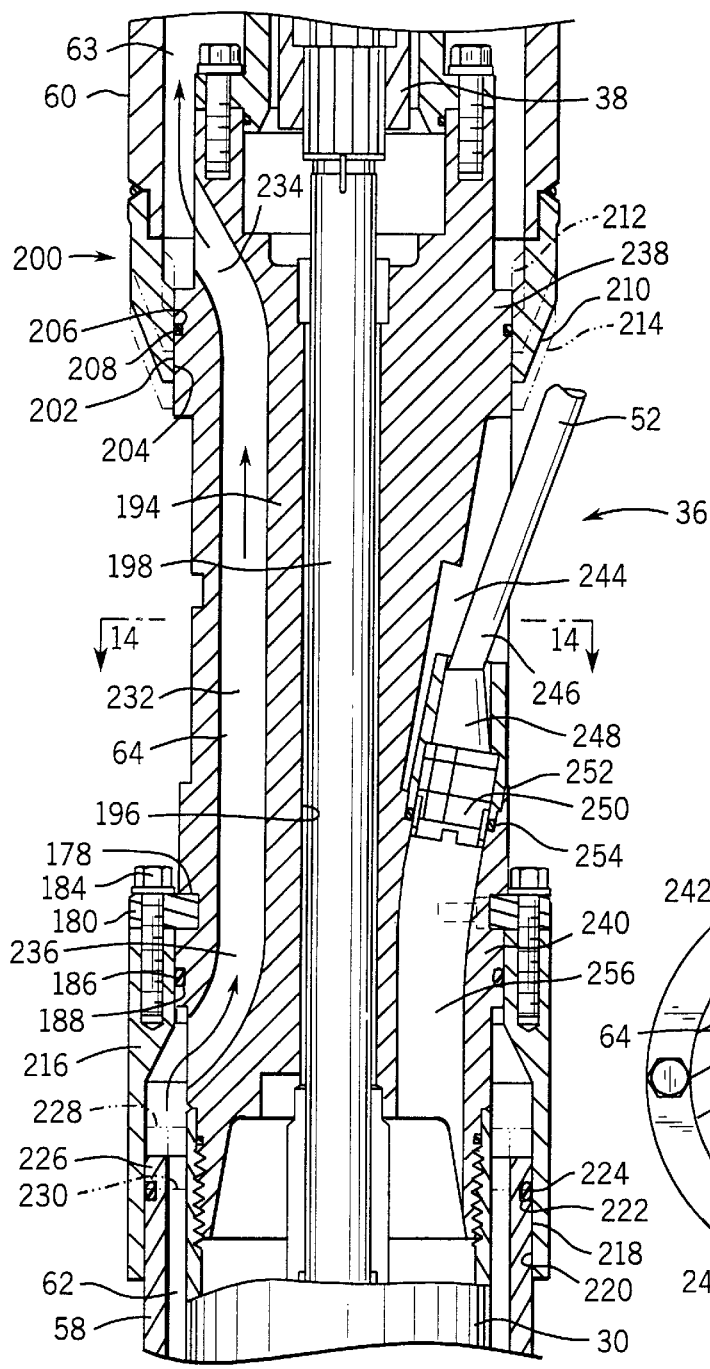
FIG. 13 is a sectional view through a connection module of the type illustrated in FIGS. 2 and 3, showing the manner in which internal passageways and electrical cable connections are made within the connection module, as well as the manner in which extensible shroud sections are coupled to the pumping system in which the connection module is disposed.

As mentioned above, each shroud is extendible and contractible with thermal expansion of both the shrouds and the pumping unit to maintain a fluid-tight seal about the flow paths defined between the shrouds and the pumping unit. FIG. 13 illustrates two presently preferred arrangements for permitting such thermal expansion and contraction. As shown in FIG. 13, a shroud, such as upper shroud 60, may establish a fluid-tight seal about a component of pumping unit 12, such as connection module 36 as shown in FIG. 13. In general, as described in greater detail below, connection module 36 includes a body 194 traversed by a bore 196 which permits a drive shaft 198 to be rotatably positioned within and to conduct torque through module 36 from motor 30 to pump 28 (see FIG. 2). A lower end 200 of shroud 60 is fitted about body 194 and provides a sliding seal with the outer periphery of the body. Accordingly, an inner annular sealing land or region 202 is formed about lower end 200 of shroud 60, while a similar sealing land or region 204 is formed about the outer periphery of body 194. A seal groove 206 is formed within sealing region 204 and an annular fluid seal member 208 is disposed therein.

When shroud 60 is fitted to body 194, seal member 208 is compressed and sealing regions 202 and 204 are brought into mutually facing relation with one another to seal fluid path 63 within shroud 60 in fluid communication with fluid passage 64 formed in connection module 36. As shroud 60 and the elements contained within shroud 60 expand and contract due to temperature variations within the wellbore, thermal expansion and contraction is accommodated by relative movement of sealing regions 202 and 204 with respect to one another. In particular, as shown in FIG. 13, shroud 60 is assembled to position lower end 200 thereof in a nominal position 210. However, the shroud and the pumping unit components may expand and contract during assembly, transport and use between predetermined lengths wherein lower end 200 is located within a maximal upper position 212 and a maximal lower position 214. As will be appreciated by those skilled in the art, the lengths and positions of sealing regions 202 and 204 are designed to maintain sealing engagement of shroud 60 about body 194 throughout the anticipated thermal expansion and contraction cycles of the equipment. In general, the lengths and locations of regions 202 and 204 will depend upon the relative lengths of the shroud and upon the pumping unit components contained within the shroud, the thermal expansion coefficients of each, and the anticipated temperature range to which the elements will be subjected.

FIG. 13 also illustrates another preferred configuration for permitting relative thermal expansion and contraction of a shroud and pumping unit components. Specifically, as illustrated in the lower portion of FIG. 13, shroud 58 is secured to a lower portion of connection module 36 by means of a flanged coupling structure similar to that described above with respect to FIG. 11. Specifically, a flange 180 is fitted within a flange groove 178 formed within body 194 of connection module 36. A flange coupling 216 is secured to flange 180 by means of fasteners 184. A fluid-tight seal is established between body 194 and flange coupling 216 by a seal 186 fitted within a groove 188 formed in body 194.

Flange coupling 216 includes an open lower end for receiving an upper end of shroud 58. An inner peripheral sealing land or region 218 is formed within coupling 216, while a facing sealing land or region 220 is formed about the outer periphery of shroud 58. A seal groove 222 is formed about the outer periphery of shroud 58, and a sealing member 224 is fitted within the groove. When shroud 58 is fitted within coupling 216, regions 218 and 220 are brought into mutually facing relation and sealing member 224 is compressed. A fluid-tight seal is thus established between sealing regions 218 and 220 which is maintained throughout expansion and contraction of the shroud and of the components covered by the shroud during cycling. Accordingly, upon installation, shroud 58 will extend into coupling 216 in a nominal position as indicated by reference numeral 226. During expansion and contraction cycles of the equipment, shroud 58 and coupling 216 will move relative to one another between a maximal upper position 228 and a maximal lower position 230. As described above with respect to sealing regions 202 and 204, the length and amount of engagement between sealing regions 218 and 220 will depend upon the relative lengths of the shroud and pumping unit components covered by the shroud, as well as upon their coefficients of thermal expansion and the anticipated temperature variations to which the equipment will be subjected during use.

As mentioned above, in the preferred embodiment illustrated, connection module 36 permits a fluid flow path to be established within pumping system 10, while facilitating electrical connection of cable 52 to motor 30 (or cables 52A and 52B to motors 30A and 30B). FIG. 13 illustrates a presently preferred embodiment of connection module 36.

Thus, connection module 36 includes a body 194 through which a bore 196 is formed for permitting a power transmission shaft 198 to be connected between modular components on either side of connection module 36. As installed in the particular arrangement illustrated in FIG. 13, connection module 36 extends between motor 30 and motor protector 38, the latter component being in turn coupled to production pump 28. However, it should be understood that connection module 36 may be secured between a motor 30 and other components of pumping system 10 as desired depending upon the particular system configuration. Also as described above, connection module 36 preferably includes features for coupling fluid conduits, such as shrouds 58 and 60 in fluid communication with an internal passage 64 traversing connection module 36. In the embodiment of FIG. 13, such features include a sliding sealing arrangement formed by sealing region 204 and seal 208, and a fixed flange arrangement including groove 178, flange 180, and seal 186. Moreover, the fluid directing features may be provided in a single unitary structure as illustrated in FIG. 13, or may be formed in separable modular components which are assembled to form a unitary structure.

Figure 14:
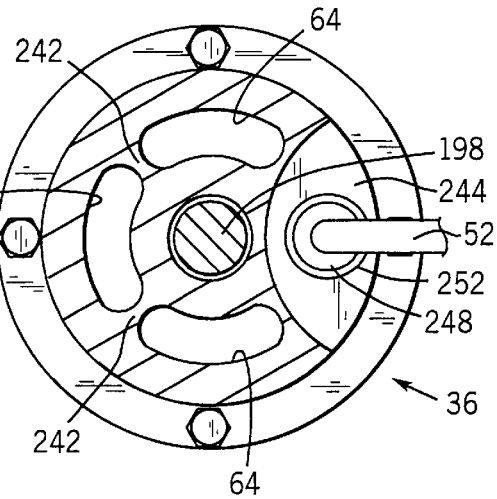
FIG. 14 is a sectional view through the connection module of FIG. 13 along line 14—14, illustrating a preferred arrangement of internal passageways within the connection module.

As illustrated in FIG. 13, fluid passage 64 preferably includes an elongated central portion 232 and a pair of outwardly angled portions 234 and 236 formed within upper and lower interface ends 238 and 240, respectively, of connection module 36. This preferred form of fluid passage 64 permits the outer dimensions of connection module 36 to be maintained within a compact envelope as needed to fit within wellbore 16, while directing fluid to internal fluid paths defined by the adjacent shrouds. Moreover, while a single fluid passage 64 may be provided in connection module 36, a plurality of such passages are preferably radially spaced within body 194 as illustrated in FIG. 14. Each passage is separated by an internal partition 242 formed within body 194.

In addition to fluid passage 64, connection module 36 includes a recess 242 for receiving cable 52. As will be appreciated by those skilled in the art, because power and data signals are typically transmitted via a multi-conductor cable 52, electrical connection must be made between the submergible motor 30 and power supply and data control and monitoring equipment above the earth's surface. In the embodiment illustrated in FIGS. 13 and 14, recess 244 serves to receive a terminal portion 246 of cable 52 to which a terminal plug 248 is attached. Cable 52 and terminal plug 248 are preferably of known design. Moreover, in the presently preferred embodiment, connection module 36 includes an electrical connector 250 which interfaces with plug 248 to convey power to motor 30. Connector 250 is provided in a socket 252 which is equipped with a peripheral seal 254 for sealing conductors extending from plug 248 and connector 250. A passageway 256 is formed in body 194 to accommodate conductors (not illustrated in FIG. 13) for conveying electrical power to motor 30 from connector 250.

As will be appreciated by those skilled in the art, connection module 36 thus serves multiple functions within pumping unit 12. Specifically, module 36 facilitates transfer of fluids between the system components, particularly between fluid paths defined by shroud 58 and 60. Moreover, module 36 enables components on either side thereof to be driven via a power transmission shaft 198. Finally, connection module 36 serves as a motor head for completing current carrying paths between a power supply cable and a submergible motor included within pumping unit 12 without the need to traverse a fluid shroud extending around the system components.

Figure 15:
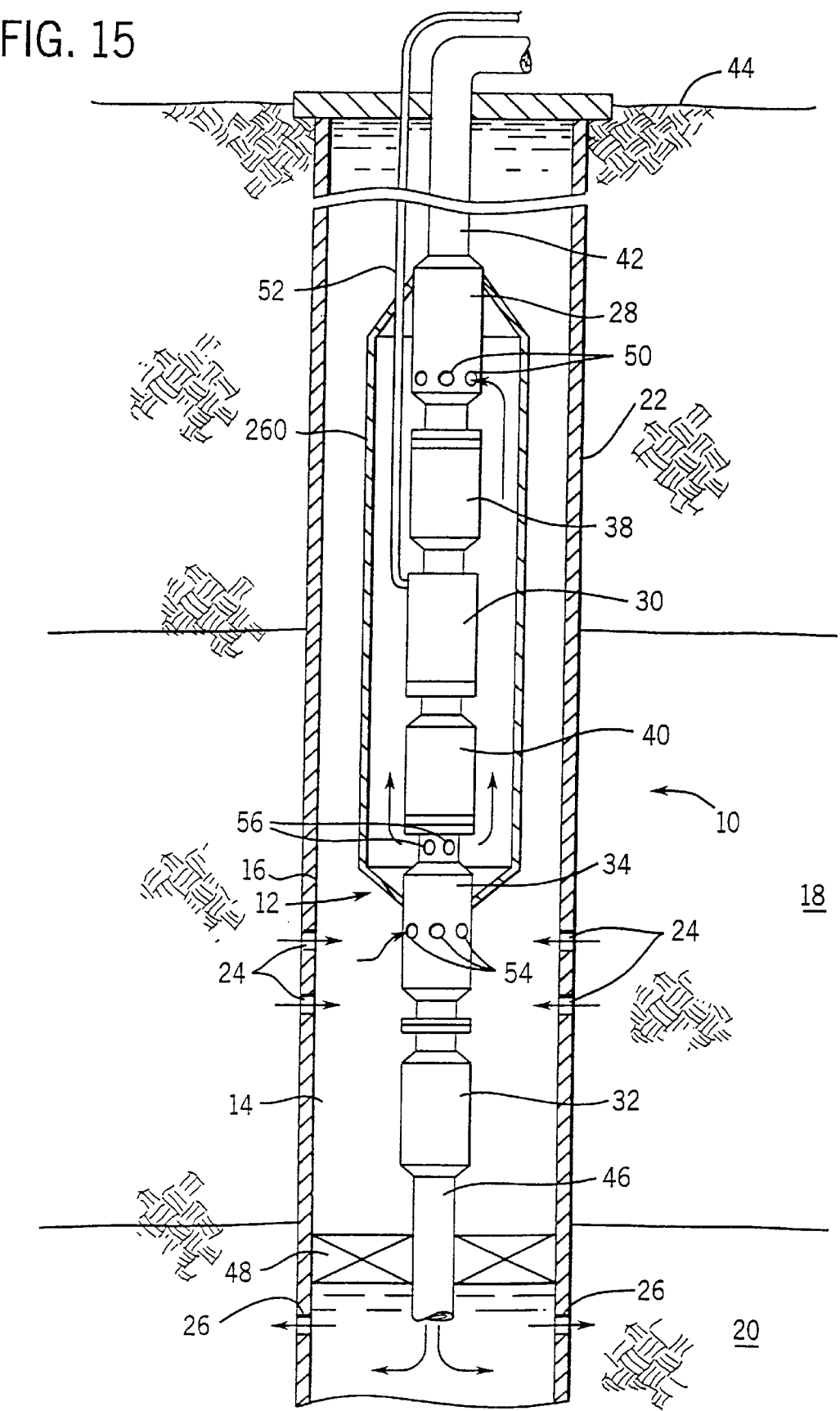
FIG. 15 is a vertical elevational view of an alternative configuration of a pumping system employing a drive-through fluid separator in accordance with the present technique.
Figure 16:
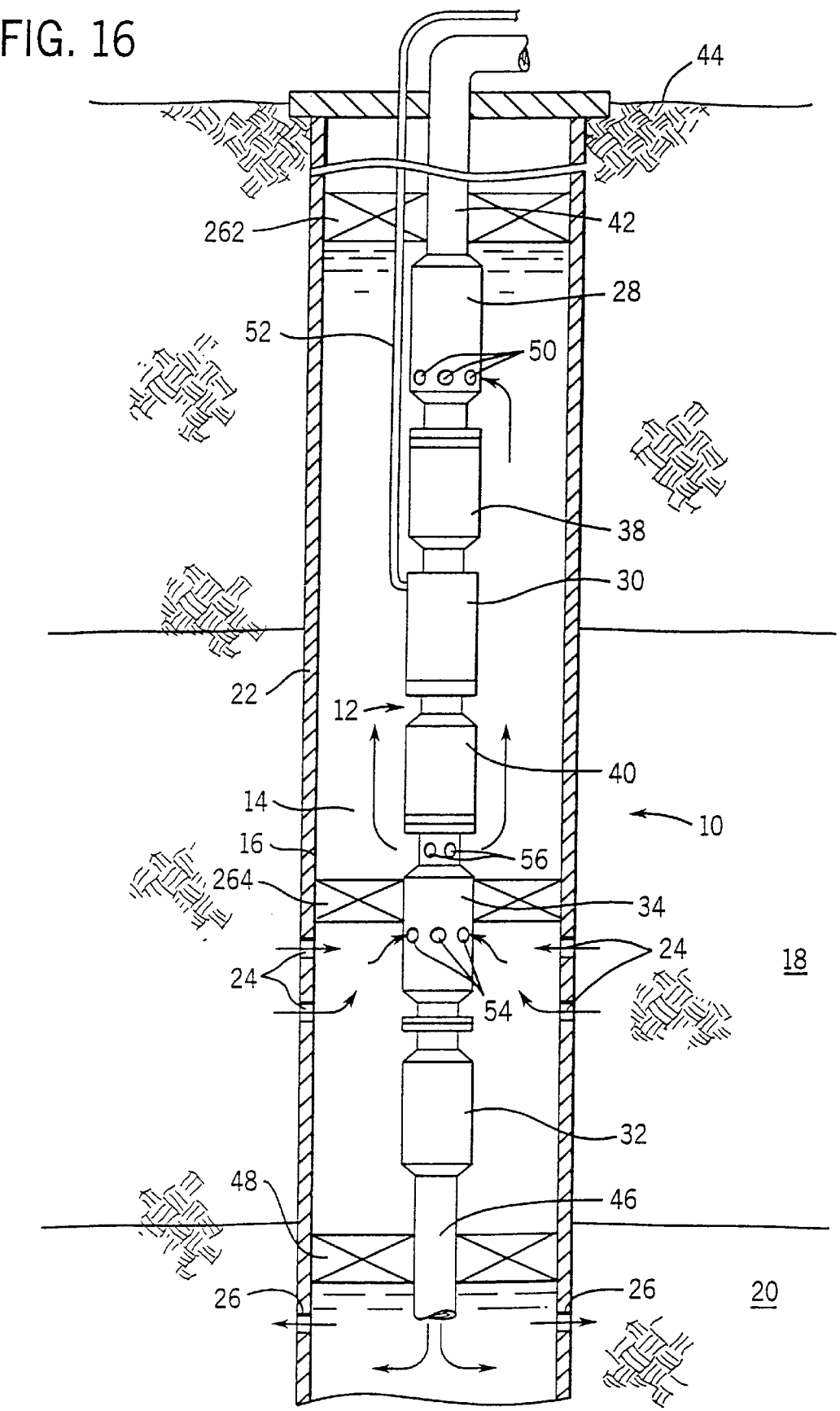
FIG. 16 is a vertical elevational view of another alternative configuration of a pumping system including a drive-through separator.
Figure 17:
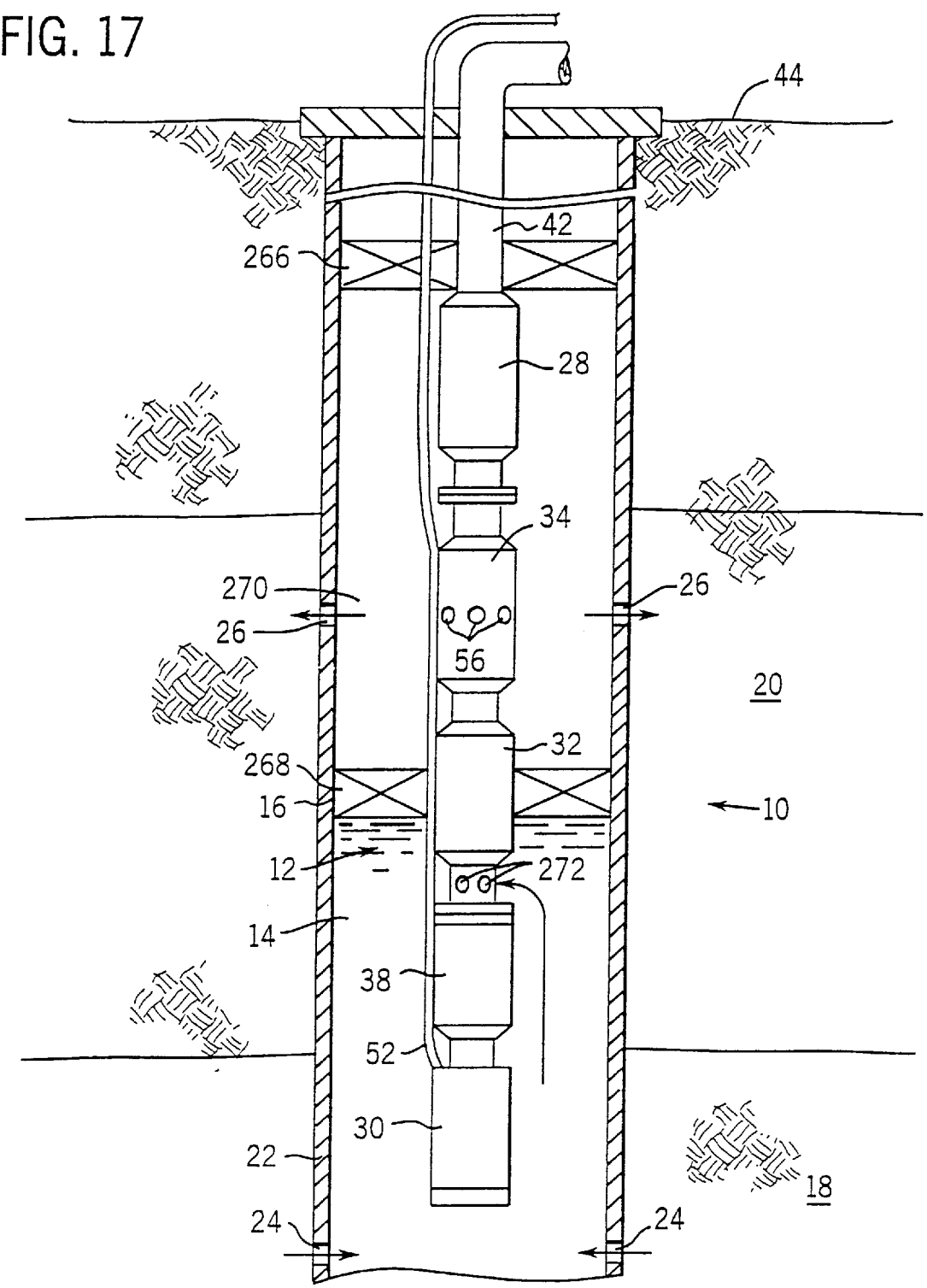
FIG. 17 is a vertical elevational view of a further alternative configuration of a pumping system including a drive-through separator.

While the drive-through separator described above is particularly well suited for use in pumping systems including connection modules and adjustable shrouds, as will be appreciated by those skilled in the art, such separators may be used in other system configurations. FIGS. 15–17 illustrate several alternative system configurations presently envisioned. In the configuration illustrated in FIG. 15, a motor 30 is coupled to first and second pumps 28 and 32, respectively, through motor protectors 38 and 40. In addition, a drive-through separator 34 of the type described above is interposed between motor protector 40 and pump 32. However, flow is directed from separator 34 to pump 28 via a single elongated shroud 260, which may comprise several tubular sections joined to one another as described above. Shroud 260 is traversed by power cable 52, which is coupled to motor 30 in a conventional manner. A seal (not shown) is provided at the location where cable 52 enters shroud 260 to separate production fluids flowing within the shroud from wellbore fluids located adjacent to system 10.

In the further alternative configuration illustrated in FIG. 16, fluids flowing within wellbore 16 are isolated from one another by means of packers rather than shrouds or conduits, to define the desired flow paths. Thus, an upper flow region is defined between separator 34 and production pump 28 by setting an upper packer 262 about production tubing 42, and an intermediate packer 264 about separator 34. When pumps 28 and 32 are then driven by motor 30, wellbore fluids are drawn into separator 34, and production fluids are expelled into the flow region above intermediate packer 264. The production fluids then flow upwards within wellbore 16, past motor 30 and into intake apertures 50 of pump 28. Non-production fluids are communicated directly by separator 34 into pump 32, from which they are forced into discharge zone 20, again isolated by lower packer 48.

As described above, while separator 34 is particularly well suited to pull-through system configurations wherein wellbore fluids are drawn into the separator by suction from a downstream pump, such as pump 28, separator 34 may also be employed in push through systems, as illustrated in FIG. 17. In the embodiment of FIG. 17, pumping system 10 includes a motor 30 coupled to a lower pump 32, and to a production pump 28 through the intermediary of a drive-through separator 34. As in the previous embodiment, motor protector 38 is positioned adjacent to the motor to isolate the motor from fluids circulating within the pumps. However, because in the application illustrated in FIG. 17 production zone 18 lies physically beneath discharge zone 20, a pair of packers 266 and 268 are provided adjacent to discharge zone 20 to isolate a region 270 of wellbore 16 adjacent to discharge zone 20. Power cable 52 is routed through these packers in a manner known in the art. Mechanical power is transmitted through separator 34 to drive both pumps 32 and 28. In operation, wellbore fluids entering through perforations 24 are drawn into pump 32 through intake apertures 272 and are forced through separator 34. Non-production fluids exit from separator 34 and are forced directly into zone 20, while production fluids are transferred into pump 28 via internal fluid passages as described above. Pump 28 then transfers the production fluids to a location above the earth's surface through production conduit 42.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A separator for use in a pumping system positionable in a wellbore to pump production fluids from the wellbore and to dispose of non-production fluids, the separator comprising:
   a housing, the housing being positionable between a pump and a motor;
   at least one separating section within the housing, the separating section including a hydrocyclone separator and being configured to receive a wellbore fluids and to separate the wellbore fluids into production and non-production fluids; and
   a power drive train traversing the housing wherein the power drive train can operatively couple the pump to the motor.

2. The separator of claim 1, wherein the power drive train includes a shaft extending through at least a portion of the housing, the shaft operative to transmit torque from the motor to the pump.

3. The separator of claim 2, further comprising a bearing disposed within the housing for supporting the shaft in rotation within the housing.

4. The separator of claim 2, wherein the housing has a central axis and the shaft is disposed parallel to and offset from the central axis.

5. The separator of claim 2, wherein the housing has a central axis and the shaft is disposed coaxially with the housing.

6. The separator of claim 1, further comprising a plurality of bearings disposed within the housing for supporting the power drive train in rotation.

7. The separator of claim 1, wherein the separating section includes a plurality of hydrocyclone separating sections.

8. A downhole fluid separating system for separating production fluids from non-production fluids in a wellbore, the system comprising:
   a pump for pumping the production fluids;
   a fluid conduit coupled to the pump for transferring the production fluids from the pump to the earth's surface;
   a motor operatively coupled to the pump for driving the pump;
   a separator interposed between the pump and the motor, including a housing and at least one hydrocyclone separator disposed in the housing, the separator receiving wellbore fluids and separating the wellbore fluids into production fluids and non-production fluids; and
   a power drive train for transmitting torque from the motor to the pump, the power drive train at least partially disposed within the separator.

9. The fluid separating system of claim 8, wherein the power drive train includes a shaft extending through at least a portion of the separator housing.

10. The fluid separating system of claim 9, wherein the separator housing has a central axis, and wherein the shaft is disposed substantially along the central axis.

11. The fluid separating system of claim 8, further comprising an injection pump operatively coupled to the motor, the injection pump delivering the wellbore fluid to the separator.

12. The fluid separating system of claim 11, wherein the injection pump is operatively coupled to the motor via the power drive train.

13. A fluid separating system for separating wellbore fluid into production and non-production fluids, the separating system comprising:
   a submergible motor;
   a separator for receiving the wellbore fluid and for separating the wellbore fluid into the production and non-production fluids;
   a first pump operatively coupled to the motor for circulating the wellbore fluid through the separator; and
   a second pump operatively coupled to the motor for pumping the production fluid from the separator to the earth's surface;
   wherein the separator is disposed between the motor and at least the first or the second pump and includes means for transmitting mechanical power from the motor, the separator including a housing and at least one hydrocyclone separator disposed within the housing, and wherein the first pump is operatively coupled to the motor by a drive train traversing the separator housing.

14. The system of claim 13, wherein the separator is disposed between the first and second pumps.

15. The system of claim 13, wherein the separator includes at least one bearing disposed in the housing for supporting the drive train in rotation.

16. The system of claim 13, wherein the first pump is close coupled to the separator and circulates wellbore fluid through the separator in a pull-through configuration.

17. The system of claim 13, wherein the housing has a central axis and the drive train includes a shaft disposed substantially coaxially along the central axis.

* * * * *